United States Patent
Pfaendner et al.

(10) Patent No.: US 6,767,949 B1
(45) Date of Patent: Jul. 27, 2004

(54) COMPOSITION AND METHOD FOR COLOR IMPROVEMENT OF NITROXYL CONTAINING POLYMERS

(75) Inventors: Rudolf Pfaendner, Rimbach (DE); Michael Roth, Lautertal (DE); Wiebke Wunderlich, Bologna (IT)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/130,866

(22) PCT Filed: Nov. 16, 2000

(86) PCT No.: PCT/EP00/11378

§ 371 (c)(1),
(2), (4) Date: May 22, 2002

(87) PCT Pub. No.: WO01/38431

PCT Pub. Date: May 31, 2001

(30) Foreign Application Priority Data

Nov. 25, 1999 (EP) .......................... 998110894

(51) Int. Cl.$^7$ ................................. C08L 3/28
(52) U.S. Cl. ................. 524/429; 524/415; 524/417; 524/414; 524/421; 524/419; 524/418; 524/490; 524/474
(58) Field of Search .................. 524/177, 157, 524/474, 236

(56) References Cited

U.S. PATENT DOCUMENTS

| | | | |
|---|---|---|---|
| 3,966,711 A | 6/1976 | Rasberger | 260/239.3 |
| 3,971,757 A | 7/1976 | Rasberger | 260/45.8 |
| 4,131,599 A | 12/1978 | Brunetti et al. | 260/45.8 |
| 4,672,088 A | 6/1987 | Scott et al. | 524/236 |
| 5,063,259 A * | 11/1991 | Wanat et al. | 523/201 |
| 5,322,912 A | 6/1994 | Georges et al. | 526/204 |
| 5,610,249 A * | 3/1997 | Ogawa | 526/193 |
| 5,627,248 A | 5/1997 | Koster et al. | 526/217 |
| 5,817,821 A | 10/1998 | Valet et al. | 546/188 |
| 5,880,230 A | 3/1999 | Syrinek et al. | 526/83 |
| 5,980,783 A | 11/1999 | Gugumus | 252/401 |
| 6,091,491 A | 7/2000 | Chisholm et al. | 356/301 |
| 6,353,107 B1 * | 3/2002 | Kramer et al. | 546/216 |
| 6,458,956 B1 * | 10/2002 | Sutoris et al. | 546/210 |

FOREIGN PATENT DOCUMENTS

| | | | |
|---|---|---|---|
| EP | 0628595 | 12/1994 | |
| EP | 0638616 | 2/1995 | |
| EP | 0735052 | 10/1996 | |
| EP | 0897930 | 2/1999 | |
| WO | 94/11412 | 5/1994 | |
| WO | 96/24620 | 8/1996 | |
| WO | 98/07758 | 2/1998 | |
| WO | 98/44008 | 10/1998 | |
| WO | 99/07664 | 2/1999 | |
| WO | 99/46261 | 9/1999 | |
| WO | 00/34220 | 6/2000 | |
| WO | WO 00/34220 A2 * | 6/2000 | C07C/51/00 |
| WO | 01/12721 | 2/2001 | |
| WO | 01/60322 | 8/2001 | |
| WO | 02/38632 | 5/2002 | |

* cited by examiner

*Primary Examiner*—David W. Wu
*Assistant Examiner*—Rip A Lee
(74) *Attorney, Agent, or Firm*—Tyler A. Stevenson

(57) ABSTRACT

The invention relates to a composition comprising, a) at least one oligomer, cooligomer, polymer or copolymer or blends thereof, containing a stable free nitroxyl radical (1); and b) a reducing agent; with the proviso that the composition is essentially free of a polymerizable monomer. A further subject is a process for improving the color of an oligomer, cooligomer, polymer or copolymer or blend thereof, containing a stable free nitroxyl radical (1); by adding a reducing agent to said polymer and heating said mixture to above the glass temperature in case of amorphous polymers or above the melting point in case of crystalline or semi-crystalline polymers

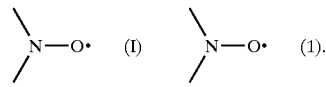

8 Claims, No Drawings

COMPOSITION AND METHOD FOR COLOR IMPROVEMENT OF NITROXYL CONTAINING POLYMERS

The invention relates to a composition and process for color improvement of nitroxyl or nitroxyl ether containing polymers.

Stable free nitroxyl radicals or nitroxyl ethers are for example useful in controlled free radical polymerization (CFRP) and by this way incorporated into the polymer in a significant amount, leading in some cases to slightly colored polymers.

Controlled free radical polymerization (CFRP) of ethylenically unsaturated monomers has attracted continuing attention, because of its capability to produce polymers with narrow molecular weight distributions and controlled architecture such as block copolymers.

U.S. Pat. No. 4,581,429 to Solomon et al., issued Apr. 8, 1986, discloses a free radical polymerization process which controls the growth of polymer chains to produce short chain or oligomeric homopolymers and copolymers, including block and graft copolymers. The process employs an initiator having the formula (in part) R'R"N—O—X, where X is a free radical species capable of polymerizing unsaturated monomers. The reactions typically have low conversion rates. Specifically mentioned radical R'R"N—O. groups are derived from 1,1,3,3 tetraethylisoindoline, 1,1,3,3 tetrapropylisoindoline, 2,2,6,6 tetramethylpiperidine, 2,2,5,5 tetramethylpyrrolidine or di-t-butylamine.

U.S. Pat. No. 5,322,912 to Georges et al. issued Jun. 21, 1994 discloses a polymerization process using a free radical initiator, a polymerizable monomer compound and a stable free radical agent of the basic structure R'R"N—O. for the synthesis of homopolymers and block copolymers.

WO 98/13392 describes open chain alkoxyamine compounds which have a symmetrical substitution pattern and are derived from NO gas or from nitroso compounds which are suitable regulators for this type of radical polymerization.

EP-A-621 878 and EP-A-735 052 disclose a method for preparing thermoplastic polymers of narrow polydispersities by free radical-initiated polymerization, which comprises adding a free radical initiator and a stable free radical agent to the monomer compound.

WO 96/24620 describes a polymerization process in which very specific stable free radical agents are used, such as for example

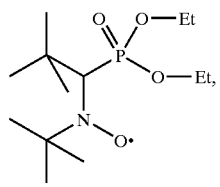

bearing a hydrogen atom in α-position to the nitrogen atom.

WO 98/30601 discloses specific nitroxyls based on imidazolidinones, which are also useful for stable free radical mediated polymerization.

In addition WO 98/44008 discloses specific nitroxyls based on morpholinones, piperazinones and piperazinediones.

All nitroxyl radicals useful in such controlled polymerization processes have inherently a reddish color.

Polymers made in the presence of such stable nitroxyl radicals or nitroxyl ethers are end-capped by the nitroxyl group. The bond, polymer to nitroxyl group however is a labile bond, which cleaves upon heating, liberating again the nitroxyl radical and giving thus color to the polymer. The color formation depends, therefore, on the concentration of nitroxyl radical/nitroxylether used to synthesize the polymer.

As many processing conditions include a heating step, e. g. removing not reacted monomer, shaping parts by extrusion, injection molding, blow molding and the like, undesirable discoloration accompanies these processes.

The problem underlying the present invention is to counteract discoloration resulting from stable free nitroxyl radicals. This problem is solved by adding a reducing agent to the polymer, preferably during a processing step, such as extrusion or injection molding.

One subject of the invention is a composition comprising, a) at least one oligomer, cooligomer, polymer or copolymer or blends thereof, containing a stable free nitroxyl radical

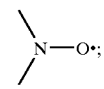

and b) a reducing agent;

with the proviso that the composition is essentially free of a polymerizable monomer.

Essentially free of a polymerizable monomer means that in some cases there may be a small amount of monomer left from manufacturing the polymer, which could not be completely removed. Preferably no monomer at all is present. Usually the excess monomer is present in an amount of a few ppm.

The nitroxyl radical may be present due to its admixture during polymerization, due to its admixture for monomer stabilization, due to its use as chain stopping agent or due to a grafting reaction after polymerization has been completed.

The nitroxyl radical may be present as a mixture with the polymer or it may be partially bound to the polymer.

The polymers, copolymers, oligomers or cooligomers which can be used in the present invention are listed below.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Polystyrene, poly(p-methylstyrene), poly(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer, and block copolymers of styrene such as styrene/butadiene/styrene, styrene/isoprene/styrene, styrene/ethylene/butylene/styrene or styrene/ethylene/propylene/styrene.

6. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

7. Polymers derived from α,β-unsaturated acids and derivatives thereof such as polyacrylates and polymethacrylates; polymethyl methacrylates, polyacrylamides and polyacrylonitriles, impact-modified with butyl acrylate.

8. Copolymers of the monomers mentioned under 7) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

9. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

10. Homopolymers and copolymers of cyclic ethers such as polyalkylene glycols, polyethylene oxide, polypropylene oxide or copolymers thereof with bisglycidyl ethers.

11. Polyacetals such as polyoxymethylene and those polyoxymethylenes which contain ethylene oxide as a comonomer; polyacetals modified with thermoplastic polyurethanes, acrylates or MBS.

12. Polyphenylene oxides and sulfides, and mixtures of polyphenylene oxides with styrene polymers or polyamides.

13. Polyurethanes derived from hydroxyl-terminated polyethers, polyesters or polybutadienes on the one hand and aliphatic or aromatic polyisocyanates on the other, as well as precursors thereof.

14. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

15. Polyureas, polyimides, polyamide-imides, polyetherimids, polyesterimids, polyhydantoins and polybenzimidazoles.

16. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

17. Polycarbonates and polyester carbonates.

18. Polysulfones, polyether sulfones and polyether ketones.

19. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/ thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferred is a composition, comprising a) at least one oligomer, cooligomer, polymer or copolymer, obtained by radical polymerization, which polymerization has been carried out in the presence of a stable free nitroxyl radical

and a source of free radicals capable of initiating polymerization, or in the presence of a nitroxyl ether

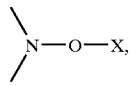

wherein X represents a group having at least one carbon atom and is such that the free radical derived from X is capable of initiating polymerization and the remaining

radical forms a stable free nitroxyl radical; and b) a reducing agent; with the proviso that the composition is essentially free of a polymerizable monomer.

As mentioned before controlled free radical polymerization of ethylenically unsaturated monomers in the presence of nitroxyl radicals or nitroxyl ethers is a known process described in numerous prior art documents. Stable free radicals having a structural element

are for example disclosed in EP-A-621 878.

Further examples such as

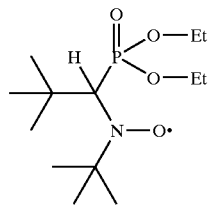 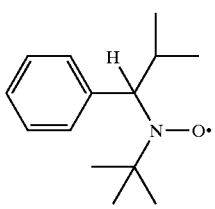

are given in WO 96/24620 and WO 00/53640.

Further examples are:

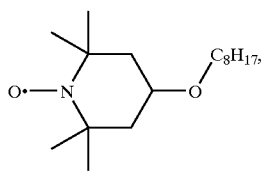 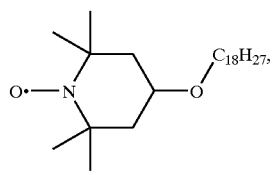

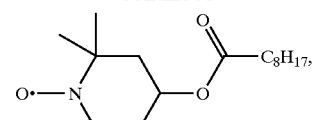

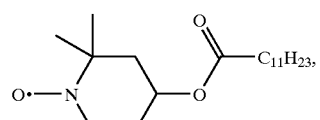

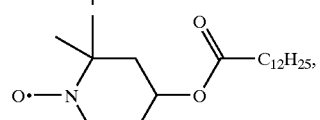

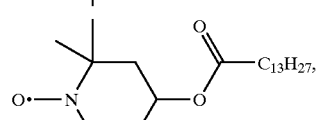

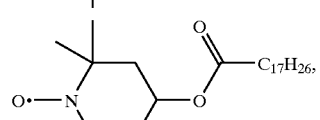

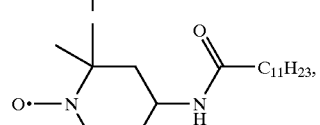

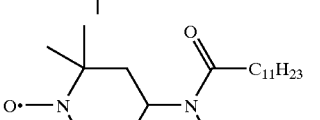

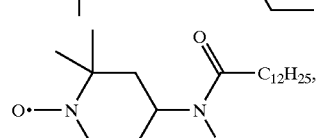

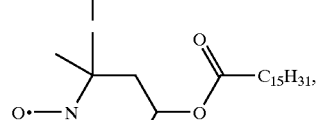

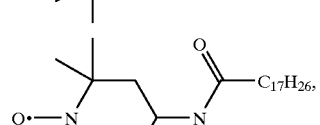

-continued

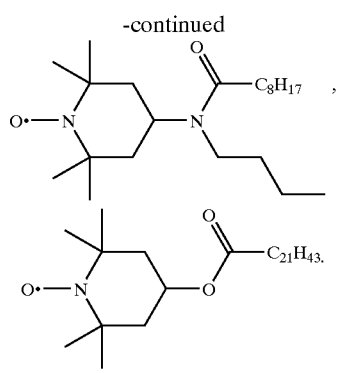

Initiator/regulator compounds containing a structural element

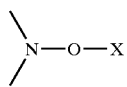

are in principal known. Suitable compounds and their manufacture are for example described in U.S. Pat. No. 4,581,429, U.S. Pat. No. 5,721,320, U.S. Pat. No. 5,627,248, WO 98/13392, WO98/30601 or in WO 98/44008.

Further suitable initiator/regulator compounds and their preparation are described in GB 2 335 190.

Further suitable individual prior art compounds are for example

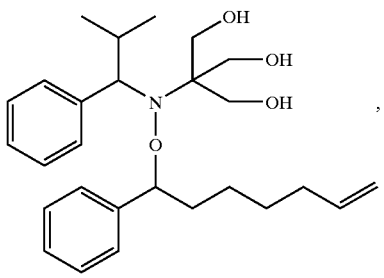

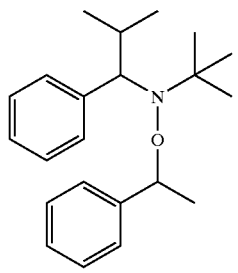

or

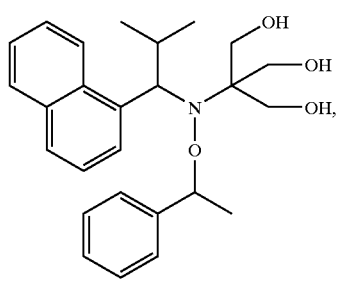

Particularly suitable compounds are listed in Table 1.

TABLE 1

| No. | Compound |
|---|---|
| 401 | |
| 402 | |
| 403 | |
| 404 | |
| 405 | |
| 406 | |
| 407 | |
| 408 | |

TABLE 1-continued

| No. | Compound |
|---|---|
| 409 | 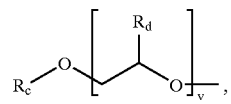 |
| 410 | |
| 411 | |
| 412 | |

Another preferred class of initiator/regulator compounds is described in the British patent application GB 2 342 649.

Typically the ethylenically unsaturated monomer or oligomer useful in controlled polymerization processes is selected from the group consisting of ethylene, propylene, n-butylene, i-butylene, styrene, substituted styrene, conjugated dienes, acrolein, vinyl acetate, vinylpyrrolidone, vinylimidazole, maleic anhydride, (alkyl)acrylic acidanhydrides, (alkyl)acrylic acid salts, (alkyl)acrylic esters, (meth)acrylonitriles, (alkyl)acrylamides, vinyl halides or vinylidene halides.

Preferred ethylenically unsaturated monomers are ethylene, propylene, n-butylene, i-butylene, isoprene, 1,3-butadiene, $\alpha$-$C_5$–$C_{18}$alkene, styrene, $\alpha$-methyl styrene, p-methyl styrene or a compound of formula $CH_2$=C($R_a$)–(C=Z)–$R_b$, wherein $R_a$ is hydrogen or $C_1$–$C_4$alkyl, $R_b$ is $NH_2$, O⁻(Me⁺), glycidyl, unsubstituted $C_1$–$C_{18}$alkoxy, $C_2$–$C_{100}$alkoxy interrupted by at least one N and/or O atom, or hydroxy-substituted $C_1$–$C_{18}$alkoxy, unsubstituted $C_1$–$C_{18}$alkylamino, di($C_1$–$C_{18}$alkyl)amino, hydroxy-substituted $C_1$–$C_{18}$alkylamino or hydroxy-substituted di($C_1$–$C_{18}$alkyl)amino, —O—$CH_2$—$CH_2$—N($CH_3$)$_2$ or —O—$CH_2$—$CH_2$—N⁺H($CH_3$)$_2$An⁻; An⁻ is a anion of a monovalent organic or inorganic acid; Me is a monovalent metal atom or the ammonium ion.

Z is oxygen or sulfur.

Examples of acids from which the anion An⁻ is derived are $C_1$–$C_{12}$carboxylic acids, organic sulfonic acids such as $CF_3SO_3H$ or $CH_3SO_3H$, mineralic acids such as HCl, HBr or HI, oxo acids such as $HClO_4$ or complex acids such as $HPF_6$ or $HBF_4$.

Examples for $R_8$ as $C_2$–$C_{100}$alkoxy interrupted by at least one O atom are of formula

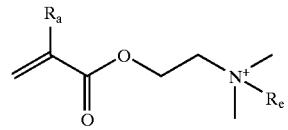

wherein $R_c$ is $C_1$–$C_{25}$alkyl, phenyl or phenyl substituted by $C_1$–$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

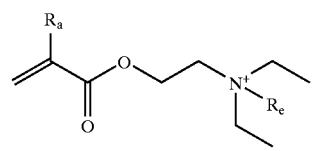

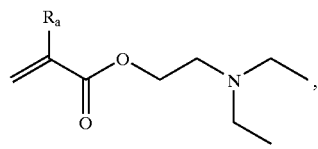

An⁻, wherein An⁻ and $R_a$ have the meaning as defined above and $R_e$ is methyl or benzyl. An⁻ is preferably Cl⁻, Br⁻ or ⁻$O_3S$—$CH_3$.

Further acrylate monomers are

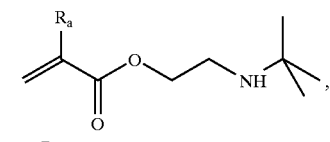

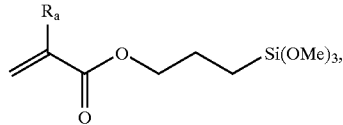

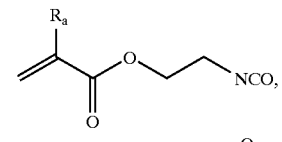

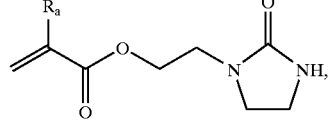

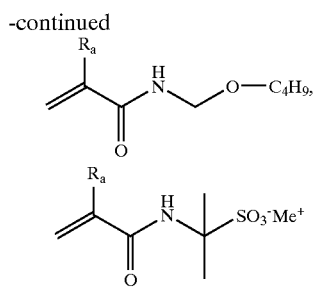

Examples for suitable monomers other than acrylates are

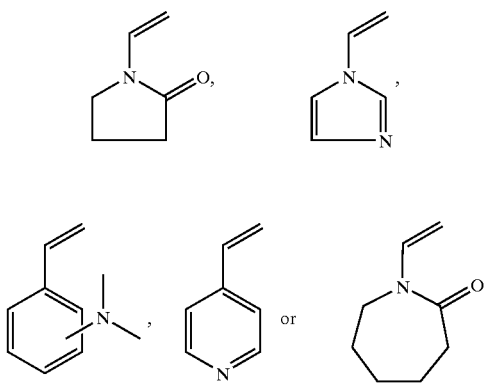

Preferably $R_a$ is hydrogen or methyl, $R_b$ is $NH_2$, gycidyl, unsubstituted or with hydroxy substituted $C_1$–$C_4$alkoxy, unsubstituted $C_1$–$C_4$alkylamino, di($C_1$–$C_4$alkyl)amino, hydroxy-substituted $C_1$–$C_4$alkylamino, or hydroxy-substituted di($C_1$–$C_4$alkyl)amino; and Z is oxygen.

Particularly preferred ethylenically unsaturated monomers are styrene, methylacrylate, ethylacrylate, butylacrylate, isobutylacrylate, tert. butylacrylate, hydroxyethylacrylate, hydroxypropylacrylate, dimethylaminoethylacrylate, glycidylacrylates, methyl(meth)acrylate, ethyl(meth)acrylate, butyl(meth)acrylate, hydroxyethyl(meth)acrylate, hydroxypropyl(meth)acrylate, dimethylaminoethyl(meth)acrylate, glycidyl(meth)acrylates, acrylonitrile, acrylamide, methacrylamide or dimethylaminopropyl-methacrylamide.

The polymerization process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

If organic solvents are used, suitable solvents or mixtures of solvents are typically pure alkanes (hexane, heptane, octane, isooctane), aromatic hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

Furthermore CFRP is particularly useful for the preparation of block copolymers.

Block copolymers are, for example, block copolymers of polystyrene and polydienes or polyacrylates (e.g., poly(styrene-b-butadiene), poly(styrene-b-isoprene), poly(styrene-b-acrylate) or poly(styrene-b-acrylate-b-styrene). They are usefull as adhesives or as compatibilizers for polymer blends or as polymer toughening agents. Poly(methylmethacrylate-b-acrylate) diblock copolymers or poly(methylacrylate-b-acrylate-b-methacrylate) triblock copolymers) are useful as dispersing agents for coating systeme, as coating additives (e.g. rheological agents, compatibilizers, reactive diluents) or as resin component in coatings(e.g. high solid paints) Block copolymers of styrene, (meth)acrylates and/or acrylonitrile are useful for plastics, elastomers and adhesives.

Block copolymers prepared by CFRP, wherein the blocks alternate between polar monomers and nonpolar monomers, are useful in many applications as amphiphilic surfactants or dispersants for preparing highly uniform polymer blends.

The (co)polymers may have a number average molecular weight from 1 000 to 400000 g/mol, preferably from 2 000 to 250 000 g/mol and, more preferably, from 2 000 to 200 000 g/mol. The number average molecular weight may be determined by size exclusion chromatography (SEC), matrix assisted laser desorption/ionization mass spectrometry (MALDI-MS) or, if the initiator carries a group which can be easily distinguished from the monomer(s), by NMR spectroscopy or other conventional methods.

A plurality of specifically designed polymers and copolymers are accessible by this type of controlled radical polymerization, such as star and graft (co)polymers as described, inter alia, by C. J. Hawker in Angew. Chemie, 1995, 107, pages 1623–1627, dendrimers as described by K. Matyaszewski et al. in Macromolecules 1996, Vol 29, No. 12, pages 4167–4171, graft (co)polymers as described by C. J. Hawker et al. in Macromol. Chem. Phys. 198, 155–166 (1997), random copolymers as described by C. J. Hawker in Macromolecules 1996, 29, 2686–2688, or diblock and triblock copolymers as described by N. A. Listigovers in Macromolecules 1996, 29, 8992–8993.

Preferably the reducing agent is a cyclic ethylenically unsaturated compound having an allylic hydrogen atom, a phosphorous compound with oxidation number I–IV and a valence of 3 to 5 or a sulfur compound with oxidation number I–IV and a valence of 2 or 4 or a mixture thereof.

Particularly preferred is a composition, wherein the reducing agent is a mixture of a cyclic ethylenically unsaturated compound having an allylic hydrogen atom and a phosphorous compound with oxidation number I–IV and a valence of 3 to 5 or a sulfur compound with oxidation number I–IV and a valence of 2 to 4.

Particularly preferred phosphorous compounds are:

| | |
|---|---|
| $H_3PO_2$ | phosphinic acid, |
| $H_4P_2O_4$ | hypodiphosphonic acid |
| $H_3PO_3/H_4P_2O_5$ | phosphonic-/diphosphonic acid. |
| $H_4P_2O_6$ | hypodiphosphoric acid | and their ammonium, alkali or alkali earth salts. The salts may also contain crystal water.

Suitable organic phosphorous compounds are $R'—H_2PO_2$, $R'R''HPO$ or $R'R''HPO_3$, $P(OR)_3$ wherein $R'$ and $R''$ independently are $C_7–C_{18}$Aralkyl, phenyl or $C_1–C_{18}$alkyl.

Also suitable organic phosphites and phosphonites are for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2''-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite.

Especially preferred are the following phosphites:

Tris(2,4-di-tert-butylphenyl)phosphite (Irgafos® 168, Ciba-Geigy), tris(nonylphenyl)phosphite,

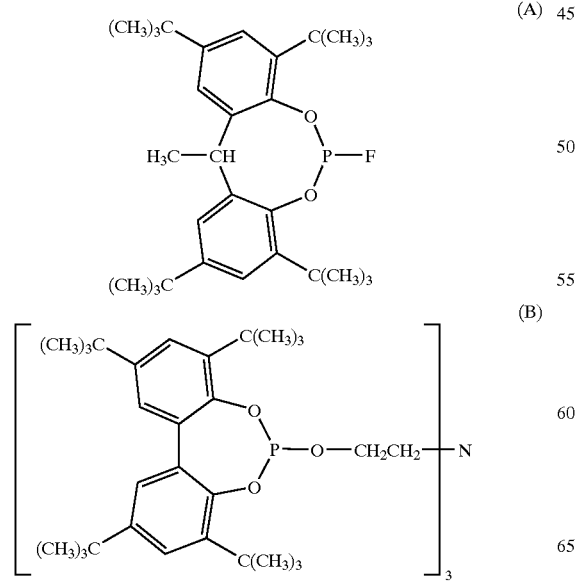

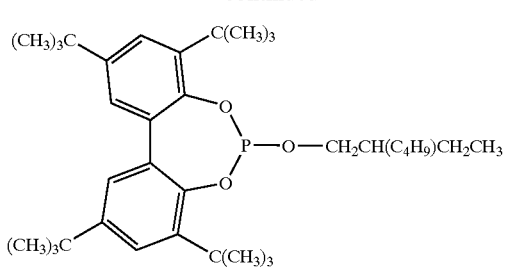

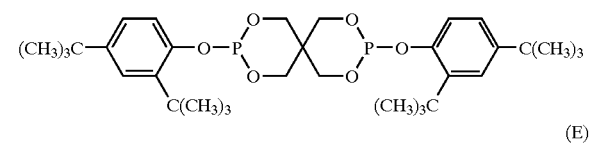

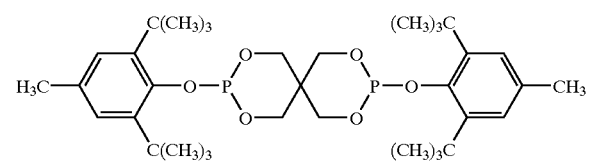

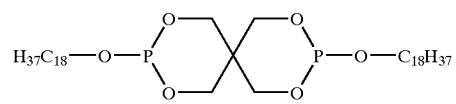

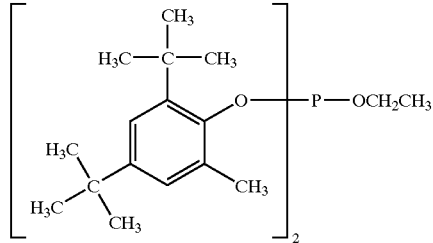

Particularly preferred sulfur compounds are:

| | |
|---|---|
| $H_2S_2O_2/H_2S_2O_3$ | sulfoxylic-/ thiosulfuric acid |
| $H_2S_2O_4$ | dithionic acid |
| $H_2SO_3/H_2S_2O_5$ | sulfurous-/disulfurous acid |
| R—S—OH | sulfenic acid |
| R—S=O—OH | sulfinic acid | and their ammonium, alkali or alkali earth salts. The salts may also contain crystal water.

Typically the alkali or alkali earth metal is Li, Na, K, Ca, Mg. The salts can contain additional crystal water.

Most preferred are $H_3PO_2$ (phosphinic acid), or a Na, K, Ca, Mg or ammonium salt thereof, with or without crystal water.

Particularly preferred is $NaH_2PO_2$ which may contain additional crystal water.

Examples of cyclic ethylenically unsaturated compounds are dihydroanthacene and dihydronaphtaline and their derivatives, wherein $R_1–R_6$ independently are H, alkyl, cycloalkyl, aryl, aralkyl, alkenyl, alkinyl or COOalkyl. The aromatic radicals may also be further substituted.

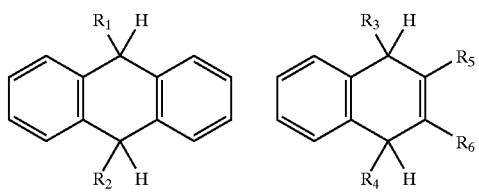

A further group is derived from indene, wherein $R_7$–$R_9$ have the same meanings as given for $R_1$–$R_6$.

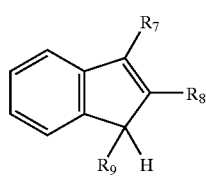

Also suitable are cycloalkenes as defined below. Wherein $R_{10}$ is H, Alkyl, Cycloalkyl, Aryl, Aralkyl, Alkenyl, Alkinyl, COOalkyl. X is $(CH_2)_n$; n is a number from 1–9 or X is $CH=CH-(CH_2)_n$ and n is 0–7 or X is $(CH=CH)_n$ and is n=0–2.

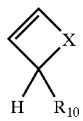

Also suitable are cyclohexadienes, wherein $R_{11}$–$R_{22}$ independently have the meaning as defined above for $R_1$–$R_6$. In addition two of each $R_{12}$ and $R_{13}$, $R_{15}$ and $R_{16}$ or $R_{19}$ and $R_{20}$ can be part of a second condensed ring system.

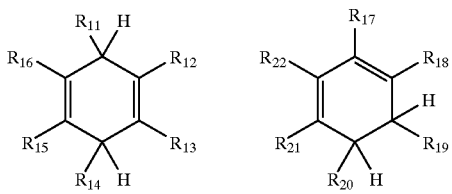

A further group are Diels-Alder adducts of cyclopentadienes, wherein $R_{23}$–$R_{28}$ independently have the same meaning as given above for $R_1$–$R_6$ and Y is —$CH_2$—, O, NH or $N(C_1$–$C_4$alkyl).

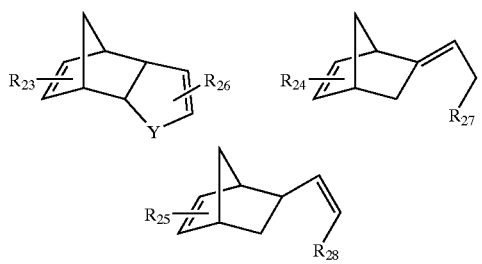

Further suitable dienes are 1,4-dienes

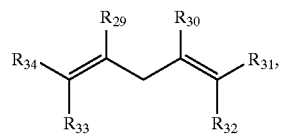

condensed aromatic systems

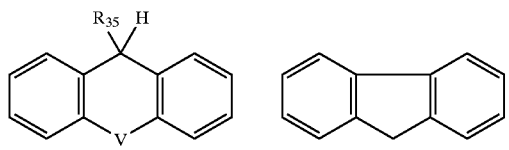

wherein V is —$CH_2$—, O, NH or $N(C_1$–$C_4$alkyl); or dihydropyridines

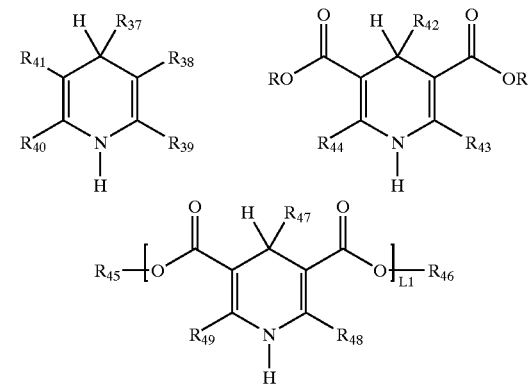

$L_1$=1–20

Particularly suitable are polyindene, poly-α-pinene and poly-β-pinene of the general formulae

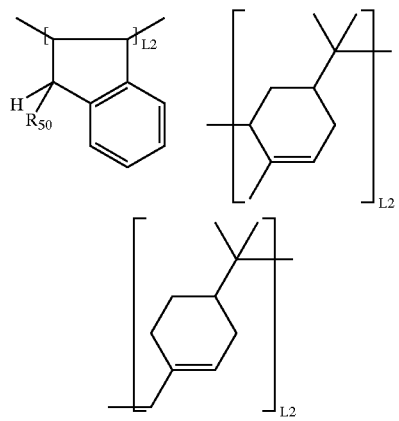

The substituents $R_{29}$–$R_{50}$ have the same meaning as given for $R_1$–$R_6$ and L2 is a number from 1–100.

Preferably the meaning of $R_1$–$R_{50}$ so is hydrogen or $C_1$–$C_4$alkyl.

Preferably the reducing agent is a cyclic mono-, sesqui- or di-terpene having an allylic hydrogen atom.

Examples are α-terpinene, γ-terpinene, α-phellandrene, β-phellandrene, limonene, α-pinene, β-pinene, α-terpineol, cadinene, β-selinene, β-Ionone, abietic acid.

Most preferred are γ-terpinene and α-phellandrene.

The reducing agent is preferably present in an amount of from 0.01% to 5%, more preferably from of from 0.05% to 3%, based on the weight of the polymer.

The concentration to be used depends on the amount of nitroxyl present in the oligomer or polymer. Obviously for high concentrations of nitroxyl, high concentrations of the reducing agent are used. Furthermore it depends on the color improvement (color stability of the polymer) to be targeted If a mixture of a cyclic ethylenically unsaturated compound having an allylic hydrogen atom (a) and a phosphorous compound with oxidation number I–IV and a valence of 3 to 5 (b) is used, the ratio (a):(b) may vary from 1:10 to 10:1, preferably it is from 1:5 to 5:1 and most preferably from 1:2 to 2:1.

The composition can also contain further additives. Examples are given below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyloctadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, b-tocopherol, g-tocopherol, d-tocopherol and mixtures thereof (Vitamin E).

1.5. Hydroxylated thiodinhenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methytphenol), 4,4'-thiobis-(3,6-di-sec-amylphenol), 4,4'-bis(2,6-dimethylhydroxyphenyl) disulfide.

1.6. Alkylidenebisohenols, for example 2,2'-methylenebis (6-tert-butyl-4-methylphenol), 2,2'-methylenebis(6-tert-butyl-4-ethylphenol), 2,2'-methylenebis[4-methyl(α-methylcyclohexyl)-phenol], 2,2'-methylenebis(4-methylcyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine. 1,3,5-tris(3,5-dicyclohexyl-4-hydroxybenzyl)isocyanurate.

1.11. Benzylohosphonates, for example dimethyl-2,5-di-tert-butylhydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of b-(3,5-di-tert-butyl-4-hydroxyhenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of b-(5-tert-butyl-4-hydroxy-3-methylphenyl)propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of b-(3.5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide. 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of b-(3.5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexylphenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-phenienediamine, 4-(ptoluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-otylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy) carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

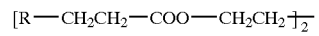

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-odecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-b,b-diphenylacrylate, isooctyl α-cyano-b,b-diphenylacrylate, methyl α-carbomethoxycinnamate, methyl α-cyano-b-methyl-p-methoxy-cinnamate, butyl α-cyano-b-methyl-p-methoxy-cinnamate, methyl α-carbomethoxy-p-methoxycinnamate and N-(b-carbomethoxy-b-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyidithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxy-ethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-actyloxyphenyl)-4,6-bis-(4-methylphenyl)-1,3,5-triazine, 2-(2-hydroxy-4-daodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyl oyl) oxalyl dihydrazide, N,N'-bis(salicyloyl)thiopropionyl dihydrazide.

4. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyt-N-octadecylhydroxylamine, N-heptadecylN-octadecylhydroxylamine, N,N-dialkylhydroxylamine derived from hydrogenated tallow amine.

5. Nitrones, for example, N-benzyl-alpha-phenyl-nitrone, N-ethyl-alpha-methylnitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecylnitrone, N-heptadecyl-alpha-eptadecyl-nitrone, N octadecyt-alpha-hexadecyl-nitrone, nitrone derived from N,N-dialkylhydroxylamine derived from hydrogenated tallow amine.

6. Thiosynergists, for example, dilauryl thiodipropionate or distearyl thiodipropionate.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

8. Nucleating agents, for example, inorganic substances such as talcum, metal oxides such as titanium dioxide or magnesium oxide, phosphates, carbonates or sulfates of, preferably, alkaline earth metals; organic compounds such as mono or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

9. Fillers and reinforcing asents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

10. Other additives, for example, plasticisers, lubricants, emulsifiers, pigments, rheology additives, catalysts, flow-control agents, optical brighteners, flameproofing agents, antistatic agents and blowing agents.

11. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

Another subject of the invention is a process for improving the color of an oligomer, cooligomer, polymer or copolymer or blends thereof, containing a stable free nitroxyl radical

by adding a reducing agent to said polymer and heating said mixture to above the glass temperature in case of amorphous polymers or above the melting point in case of crystalline or semi-crystalline polymers;

with the proviso that essentially no polymerizable monomer is present.

There are different reasons, why stable free nitroxyl radicals may be present in a polymer One possibility is that graft polymers have been prepared in the presence of a ndroxyl radical or a niroxyl ether. Such a process typically comprises a first step A), wherein a stable nitroxyl radical is grafted onto a polymer, which step comprises heating a polymer and a compound containing a stable NO. radical to above the melting point of the polymer, mixing and reacting the components at said temperature; and in a second step B) the grafted polymer of step A) is heated in the presence of an ethylenically unsaturated monomer or oligomer to a temperature at which cleavage of the nitroxyl-polymer bond occurs.

Such polymers, grafted in the presence of a nitroxyl radical or a nitroxyl ether are also a preferred embodiment of the present invention.

The stable free nitroxyl radical may also be present in the polymer due to its admixture for monomer stabilization or due to its use as chain stopping agent.

Preferred is a process for improving the color of polymers, obtained by radical polymerization, which polymerization has been carried out in the presence of a stable free nitroxyl radical

and a source of free radicals capable of initiating the polymerization, or in the presence of a nitroxyl ether

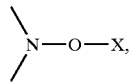

wherein X represents a group having at least one carbon atom and is such that the free radical derived from X is capable of initiating polymerization and the remaining

radical forms a stable free nitroxyl radical;

by adding a reducing agent to said polymer and heaung said mixture to above the glass temperature in case of amorphous polymers or above the melting point in case of crystalline or semi-crystalline polymers;

with the proviso that essentially no polymerizable monomer is present.

The process is preferably carried out, wherein the mixture is heated to 50°–150° C. above the glass temperature in case of amorphous polymers or 20°–180° C. above the melting point in case of crystalline or semi-crystalline polymers.

The heating step of the process may be performed in any reactor suitable for mixing a polymer melt. Preferably the reactor is an extruder or kneading apparatus as for example described in "Handbuch der Kunststoffextrusion" Vol.1, editor F. Hensen, W. Knappe and H. Potente, 1989, pages 3–7. If an extruder is used the process may be described as reactive extrusion process. Examples of reactive extrusion equipment and processes are given by G. H. Hu et al., in "Reactive Modifiers for Polymers", first edition, Blackie Academic & Professional an Imprint of Chapman & Hall, London 1997, chapter 1, pages 1–97.

Preferably, if an extruder is used, a reduced pressure of less than 200 mbar is applied during extrusion. Volatile by products may be removed thereby.

Typical reaction times are from a few seconds to several hours. Preferably the reaction time is from 10 seconds to 1 h, most preferably from 20 seconds to 20 min.

Another subject is the use of a reducing agent for improving the color of an oligomer, cooligomer, polymer or copolymer or blends thereof, containing a stable free nitroxyl radical

Still another subject of the invention is the use of a reducing agent for removing the discoloration of polymers, obtained by radical polymerization, which polymerizaton has been carried out in the presence of a stable free nitroxyl radical

and a source of free radicals capable of initiating the polymerization, or in the presence of a nitroxyl ether

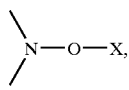

wherein X represents a group having at least one carbon atom and is such that the free radical derived from X is capable of initiating polymerization and the remaining

radical forms a stable free nitroxyl radical.

The following examples illustrate the invention.

The nitroxyl compounds A, B and C used in the following examples are known and can be prepared by oxidation of the corresponding amines for example according to U.S. Pat. Nos. 5,654,434, 5,204,473 and GB 2 335 190.

EXAMPLE 1

Color improvement of polystyrene synthesized by controlled free radical polymerization in presence of a nitroxyl radical In a 2 l reactor 1.419 g (5.858 mmol) dibenzoyl peroxide and 2.707 g (7.615 mmol) dodecanoic acid-(2,2,6,6-tetramethyl-piperidine-4-yl-1-oxyl)ester (nitroxyl A) are added to 1590 g (15.27 mol) styrene under argon atmosphere. Dissolved oxygen is removed in repeating evacuation/Ar-purging steps. The reaction mixture is stirred and heated under argon atmosphere to 125° C. for 6 hours. Remaining monomer is removed at 60° C. under vacuum. The residue is dried in a first step under vacuum and in a second step under normal pressure at 70° C. until constant weight is achieved (1390 g polystyrene, 87% conversion).

From the synthesized polystyrene a molded plaque of 2 mm thickness is prepared (molding conditions: 1 min heating, 1 min molding, 1 min pressure release, 3 min molding, T=220° C.). The yellowness index is measured according to DIN 53383.

In a twin screw extruder, model TW 100, Haake, the synthesized polystyrene is extruded together with the additives given in table 3 at a temperature $T_{max}$=220° C. (heating zones 1–5) and 40 r/min. The product is granulated from strands in a water bath. From the granules a molded plaque of 2 mm thickness is prepared (molding conditions: 1 min heating, 1 min molding, 1 min pressure release, 3 min molding, T=220° C.).

The plaques are stored at 80° C. in a circulating air drying oven in order to determine discoloration during thermal aging after definite time intervals. Table 1 shows the measured yellowness index at different time intervals (h).

TABLE 1 yellowness index of molded polystyrene prepared by controlled free radical polymerization using nitroxyl A

| | | | YI | | | | | |
|---|---|---|---|---|---|---|---|---|
| No. | polymer | additives | 0 h | 250 h | 500 h | 1000 h | 1500 h | 2000 h |
| starting material, V0 | without processing | | 10.5 | 19.2 | 20.4 | 22.4 | 26.1 | 27.2 |
| comparative example, V1 | starting material | without | 15.2 | 23.5 | 24.4 | 27.7 | 28.8 | 35.8 |
| Example 1 | starting material | 0.1% α-phellandrene + 0.1% NaH$_2$PO$_2$*H$_2$O | 7.9 | 13.0 | 13.0 | 13.5 | 14.0 | 14.1 |

EXAMPLES 2–4

Color improvement of polystyrene containing nitroxyl-radicals (model experiment)

In a twin screw extruder, model TW 100, Haake, a commercial general purpose polystyrene (PS-165/H ex BASF, MFR$_{(200/5)}$=2.9) is extruded together with 0.1% decandioic acid bis(2,2,6,6-tetramethyl-piperidine-4-yl-1-oxyl)ester (CXA 5415, commercial nitroxyl of Ciba Specialty Chemicals) at a temperature $T_{max}$=220° C. (heating zones 1–5) and 40 r/min. The product is granulated from strands in a water bath. From the granules a molded plaque of 2 mm thickness is prepared (molding conditions: 1 min heating, 1 min molding, 1 min pressure release, 3 min molding, T=220° C.). The yellowness index is measured according to DIN 53383.

The nitroxyl radical containing granulate is extruded for a second time together with the additives given in table 1 ($T_{max}$=250° C. (heating zone 1–5) and 40 r/min), granules are formed and molded plaques are prepared as given above.

The plaques are stored at 80° C. in a circulating air drying oven in order to determine discoloration during thermal aging after definite time intervals. Table 2 shows the measured yellowness index at different time intervals (h).

TABLE 2 yellowness index of molded polystyrene

| No. | polymer | additive | 0 h | 100 h |
|---|---|---|---|---|
| starting material, V0 | PS-165/H with 0.1% CXA 5415 | | 7.1 | 7.5 |
| comparative example, V2 | granulated PS, V0 | without additive | 10.8 | 11.6 |
| example 2 | granulated PS, V0 | 0.5% γ-terpinene | 5.9 | 7.0 |
| example 3 | granulated PS, V0 | 0.25% γ-terpinene + 0.25% $NaH_2PO_2 \cdot H_2O$ | 6.0 | 6.8 |
| example 4 | granulated PS, V0 | 0.5% α-phellandrene | 7.2 | 9.2 |

EXAMPLES 5–8

Color improvement of polyethylene containing nitroxyl-radicals (model experiment)

In a twin screw extruder, model ZSK 25, Werner & Pfleiderer, a commercial grade low density polyethylene (Lupolen 1812E ex BASF, $MFR_{(190/21.6)}$=34) is extruded together with 0.1% dodecanoic acid(2,2,6,6-tetramethyl-piperidine-4-yl-1-oxyl)ester at a temperature $T_{max}$=200° C. (heating zones 1–5) and 100 r/min. The product is granulated from strands in a water bath. From the granules a molded plaque of 2 mm thickness is prepared (molding conditions: 1 min heating, 1 min molding, 1 min pressure release, 3 min molding, T=220° C.). The yellowness index is measured according to DIN 53383.

The nitroxyl radical containing granulate is extruded for a second time together with the additives given in table 1 ($T_{max}$=220° C. (heating zone 1–5) and 100 r/min), granules are formed and molded plaques are prepared as given above. Table 3 shows the measured yellowness index.

TABLE 3 yellowness index of molded polyethylene

| No. | polymer | additives | YI |
|---|---|---|---|
| starting material | Lupolen 1812E with 0.1% nitroxyl A | | 18.5 |
| comparative example, V3 | granulated LDPE, starting material | without additive | 31.5 |
| example 5 | granulated LDPE, starting material | 0.1% α-phellandrene | 19.0 |
| example 6 | granulated LDPE, starting material | 0.1% $NaH_2PO_2 \cdot H_2O$ | 16.5 |
| example 7 | granulated LDPE, starting material | 0.1% α-phellandrene + 0.1% $NaH_2PO_2 \cdot H_2O$ | 15.5 |
| example 8 | granulated LDPE, starting material | 0.1% $Na_2S_2O_3$ | 22.0 | nitroxyl A = dodecanoic acid(2,2,6,6-tetramethyl-piperidine-4-yl-1-oxyl)ester

EXAMPLES 9–13

Color improvement of polystyrene containing nitroxyl-radicals (model experiment)

In a twin screw extruder, model ZSK 25, Werner & Pfleiderer, a commercial general purpose polystyrene (PS-165/H ex BASF, $MFR_{(200/5)}$=2.9) is extruded together with 0.05% octadecanoic acid(2.2,6,6-tetramethylpiperidine-4-yl-1-oxyl)ester at a temperature $T_{max}$=220° C. (heating zones 1–5) and 100 r/min. The product is granulated from strands in a water bath. From the granules a molded plaque of 2 mm thickness is prepared (molding conditions: 1 min heating, 1 min molding, 1 min pressure release, 3 min molding, T=220° C.). The yellowness index is measured on a Minolta CM 3600D according to DIN 6167.

The nitroxyl radical containing granulate is extruded for a second time together with the additives given in Table 4 ($T_{max}$=220° C. (heating zone 1–5) and 100 r/min), granules are formed and molded plaques are prepared as given above. Table 4 shows the measured yellowness index.

TABLE 4 yellowness index of molded polystyrene

| No. | polymer | additives | YI |
|---|---|---|---|
| starting material | PS-165/H with 0.1% nitroxyl B | | 5.8 |
| comparative example, V4 | granulated PS, starting material | without additive | 10.0 |
| example 9 | granulated PS, starting material | 0.1% calcuimcitrate | 7.3 |
| example 10 | granulated PS, starting material | 0.1% Irgafos TNPP | 5.9 |
| example 11 | granulated PS, starting material | 0.1% Irganox 3052 | 8.6 |
| example 12 | granulated PS, starting material | 0.1% $Mg(H_2PO_2)_2 \cdot H_2O$ | 8.5 |
| example 13 | granulated PS, starting material | 0.1% squalene | 8.5 | nitroxyl B = octadecanoic acid-(2,2,6,6-tetramethyl-piperidine-4-yl-1-oxyl)ester
Irgafos TNPP = tris(nonylphenyl)phosphite (commercial product of Ciba Specialty Chemicals)
Irganox 3052 = 2-(1,1-dimethylethyl)-6-[3-(1,1-dimethylethyl)-2-hydroxy-5-methylphenyl]methyl-4-methylphenyl acrylate (commercial product of Ciba Specialty Chemicals)

EXAMPLES 14–20

Color improvement of polystyrene containing nitroxyl-radicals (model experiment)

In a twin screw extruder, model ZSK 25, Werner & Pfleiderer, a commercial general purpose polystyrene (PS-165/H ex BASF, $MFR_{(200/5)}$=3.5) is extruded together with 0.05% acetic acid(2,6-diethyl-2,3,6-trimethyl-piperidine-4-yl-1-oxyl)ester at a temperature $T_{max}$=220° C. (heating zones 1–5) and 100 r/min. The product is granulated from strands in a water bath. From the granules a molded plaque of 2 mm thickness is prepared (molding conditions: 1 min heating, 1 min molding, 1 min pressure release, 3 min molding, T=220° C.). The yellowness index is measured on a Minolta CM 3600D according to DIN 6167.

The nitroxyl radical containing granulate is extruded for a second time together with the additives given in table 4 ($T_{max}$=220° C. (heating zone 1–5) and 100 r/min), granules are formed and molded plaques are prepared as given above. Table 5 shows the measured yellowness index.

TABLE 5 yellowness index of molded polystyrene

| No. | polymer | additives | YI |
|---|---|---|---|
| starting material | PS-165/H with 0.1% nitroxyl C | | 2.4 |
| comparative example, V5 | granulated PS, starting material | without additive | 4.2 |
| example 14 | granulated PS, starting material | 0.1% Irgafos P-EPQ | 3.5 |
| example 15 | granulated PS, starting material | 0.1% Irgafos TNPP | 2.9 |

TABLE 5-continued yellowness index of molded polystyrene

| No. | polymer | additives | YI |
|---|---|---|---|
| example 16 | granulated PS, starting material | 0.1% NaH$_2$PO$_2$*H$_2$O | 3.9 |
| example 17 | granulated PS, starting material | 0.1% α-phellandrene | 3.8 |
| example 18 | granulated PS, starting material | 0.05% α-phellandrene + 0.05% NaH$_2$PO$_2$*H$_2$O | 3.8 |
| example 19 | granulated PS, starting material | 0.1% dodecylmethacrylate | 3.3 |
| example 20 | granulated PS, starting material | 0.1% Irgafos 126 | 3.6 | nitroxyl C = acetic acid(2,6-diethyl-2,3,6-trimethyl-piperidine-4-yl-1-oxyl) ester
Irgafos P-EPQ = tetrakis(2,4-di-tert-butylphenyl)[1,1-biphenyl]4,4'-diylbisphosphonite (commercial product of Ciba Specialty Chemicals)
Irgafos TNPP = tris(nonylphenyl)phosphite (commercial product of Ciba Specialty Chemicals)
Irgafos 126 = bis(2,4-di-tert-butylphenyl)pentaerythrol-diphosphite (commercial product of Ciba Specialty Chemicals)

What is claimed is:

1. A composition comprising,
   a) at least one oligomer, cooligomer, polymer or copolymer, containing a stable free nitroxyl radical

and
   b) a reducing agent;
   which olipomer, cooligomer, polymer or copolymer is obtained by radical polymerization or by grafting, which polymerization has been carried out in the presence of a stable free nitroxyl radical

and a source of free radicals capable of initiating the polymerization, or in the presence of a nitroxyl ether

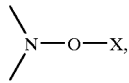

wherein X represents a group having at least one carbon atom and is such that the free radical derived from X is capable of initiating polymerization and the remaining radical is a stable free nitroxyl radical, and
   which grafting has been carried out in the presence of a nitroxyl radical or a nitroxyl ether; and
   which reducing agent is
   a cyclic ethylenically unsaturated compound having an allylic hydrogen atom,
   a phosphorus compound selected from the group consisting of H$_3$PO$_2$ (phosphinic acid), H$_4$P$_2$O$_4$ (hypodiphosphonic acid), H$_3$PO$_3$/H$_4$P$_2$O$_5$ (phosphonic-/diphosphonic acid), H$_4$P$_2$O$_6$ (hypodiphosphoric acid) and the ammonium, alkali metal or alkali earth metal salts thereof, or
   a sulfur compound selected from the group consisting of H$_2$S$_2$O$_2$/H$_2$S$_2$O$_3$ (sulfoxylic-/thiosulfuric acid), H$_2$S$_2$O$_4$ (dithionic acid), H$_2$SO$_3$/H$_2$S$_2$O$_5$ (sulfurous-/disulfurous acid), R—S—OH (sulfenic acid), R—S=O—OH (sulfinic acid) and the ammonium, alkali metal or alkali earth metal salts thereof, or
   a mixture thereof; and
   with the proviso that the composition is essentially free of a polymerizable monomer.

2. A composition according to claim 1, wherein the reducing agent is a mixture of a cyclic ethylenically unsaturated compound having an allylic hydrogen atom and a phosphorous compound or a mixture of a cyclic ethylenically unsaturated compound having an allylic hydroaen atom and a sulfur compound.

3. A composition according to claim 1, wherein the reducing agent is H$_3$PO$_2$ (phosphinic acid), or a Na, K, Ca, Mg or ammonium salt thereof, with or without water of hydration.

4. A composition according to claim 1, wherein the reducing agent is a cyclic mono-, sesqui- or di-terpene having an allylic hydrogen atom.

5. A composition according to claim 1, wherein the reducing agent is γ-terpinene or α-phellandrene.

6. A composition according to claim 1, wherein the reducing agent is present in an amount of 0.01% to 5% based on the weight of the polymer.

7. A process for improving the color of an oligomer, cooligomer, polymer or copolymer containing a stable free nitroxyl radical

by heating a composition according to claim 1 to above the glass temperature in case of amorphous polymers or above the melting point in case of crystalline or semi-crystalline polymers.

8. A process according to claim 7, wherein the mixture is heated to 50°–150° C. above the glass temperature in case of amorphous polymers or 20°–180° C. above the melting point in case of crystalline or semi-crystalline polymers.

* * * * *